United States Patent [19]

Mullen

[11] Patent Number: 5,086,999

[45] Date of Patent: Feb. 11, 1992

[54] MODULAR SPACE STRUCTURE

[76] Inventor: Charles F. Mullen, 204 Yacht Club La., Seabrook, Tex. 77586

[21] Appl. No.: 432,365

[22] Filed: Nov. 6, 1989

Related U.S. Application Data

[63] Continuation-in-part of Ser. No. 194,042, May 13, 1988, Pat. No. 4,878,637, which is a continuation-in-part of Ser. No. 900,094, Aug. 25, 1986, Pat. No. 4,744,533.

[51] Int. Cl.$^5$ ............................................. B64G 1/00
[52] U.S. Cl. .................................. 244/159; 244/158 R
[58] Field of Search .................... 244/158 R, 159, 172, 244/173; 52/67

[56] References Cited

U.S. PATENT DOCUMENTS

| | | | |
|---|---|---|---|
| 4,057,207 | 11/1977 | Hogan | 244/159 |
| 4,562,979 | 1/1986 | Taylor | 244/158 R |
| 4,715,566 | 12/1987 | Nobles | 244/159 |
| 4,728,060 | 3/1988 | Cohen | 244/159 |

OTHER PUBLICATIONS

Taylor and Associates, Inc., Space Station Architectural Elements and Issues Definition Study, 9/25/84.

*Primary Examiner*—Joseph R. Peters, Jr.
*Assistant Examiner*—Linda L. Palomar
*Attorney, Agent, or Firm*—Kenneth A. Roddy

[57] ABSTRACT

A modular space structure having a central enclosed area is erected in outer space from expandable modules transported by a reusable space shuttle or an expendable rocket. Each module comprises an outer member and one or more inner members carried telescopically therein forming a complete enclosure to serve as a small self contained space structure capable of being equipped for life support. Each inner member has slightly less volume than the outer member in which it is nested. As each inner member is extended, the interior volume is increased and a larger enclosure is formed. A two member module, when extended, would nearly double the amount of initial enclosed usable space, and an extended three member module would nearly triple the amount of initial enclosed usable space. The expandable modules serve as building blocks which may be joined to other like modules in various configurations to form a complete enclosure about a common interior volume with the modules forming the walls of the enclosure to create increasingly larger space structure units having a plurality of enclosed central areas. Passageways allow occupant communication between the modules and the central enclosure. Adapter modules and various other devices such as docking ports for docking space craft to the structure and thrust generating or communication devices may be secured to the modules.

37 Claims, 5 Drawing Sheets

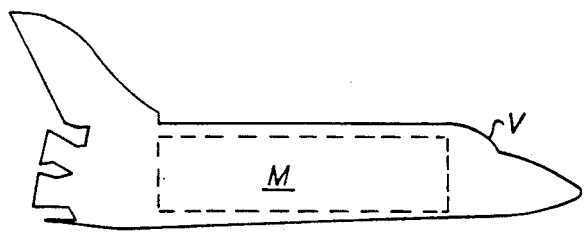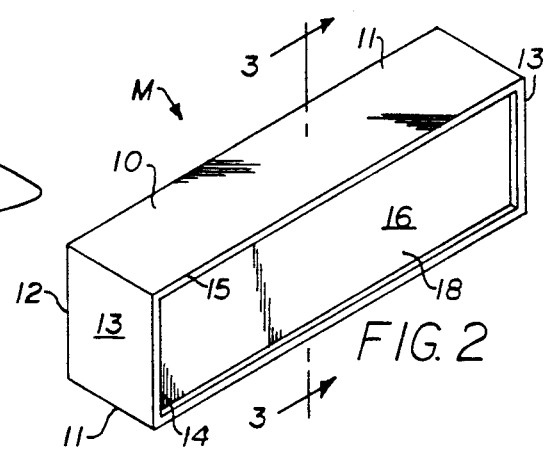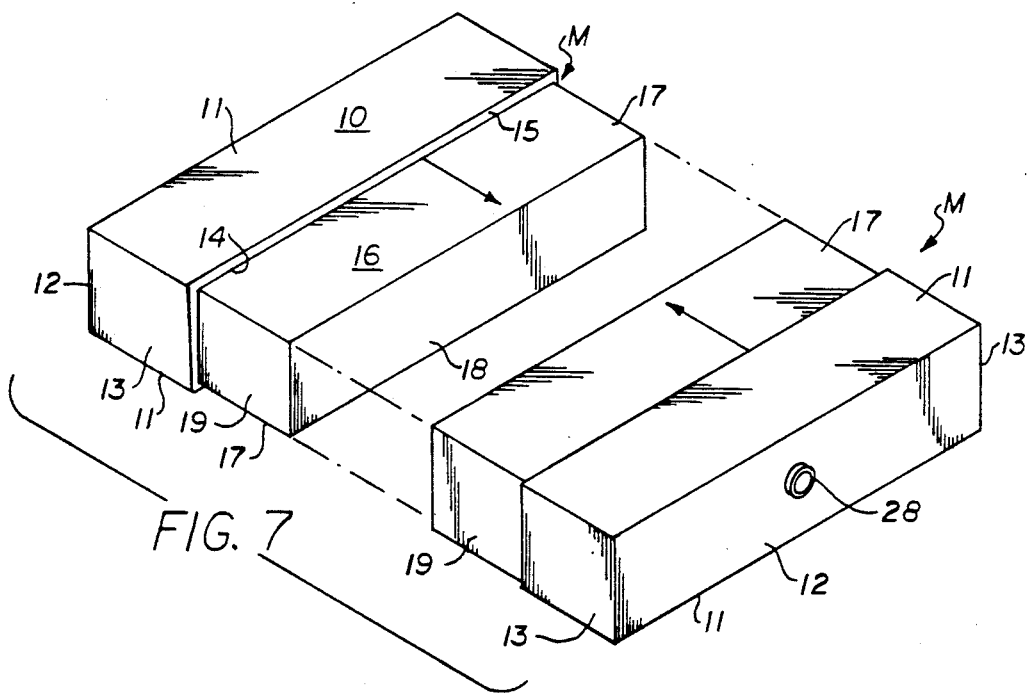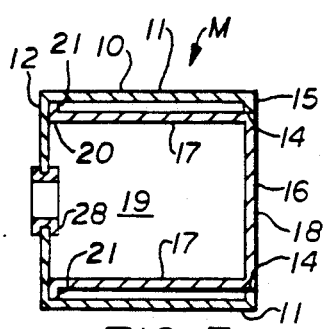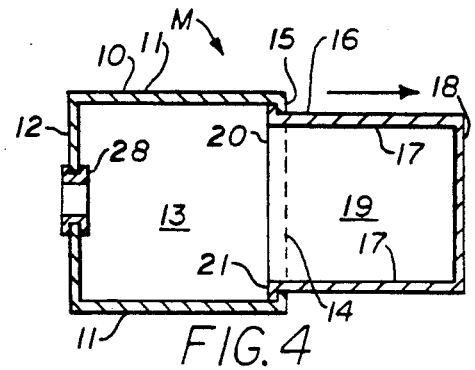

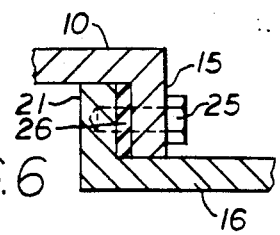
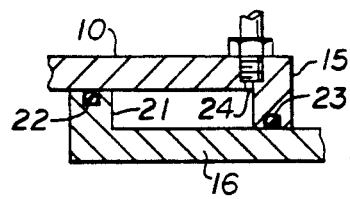
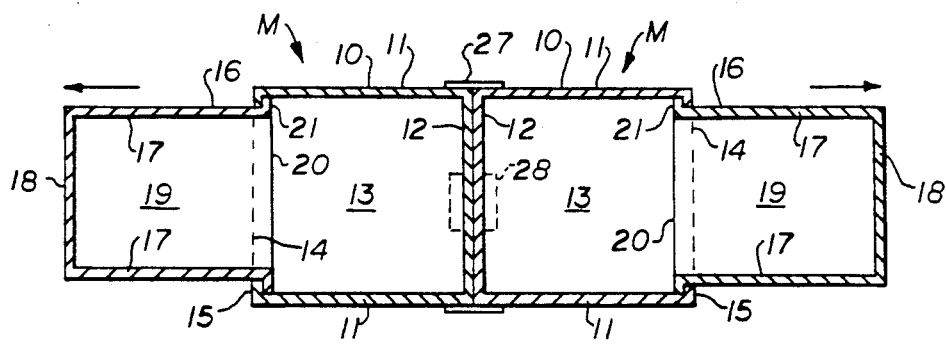
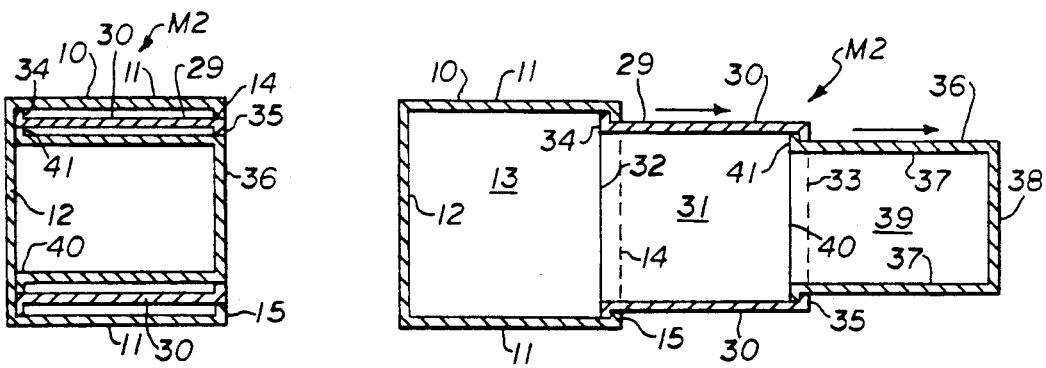
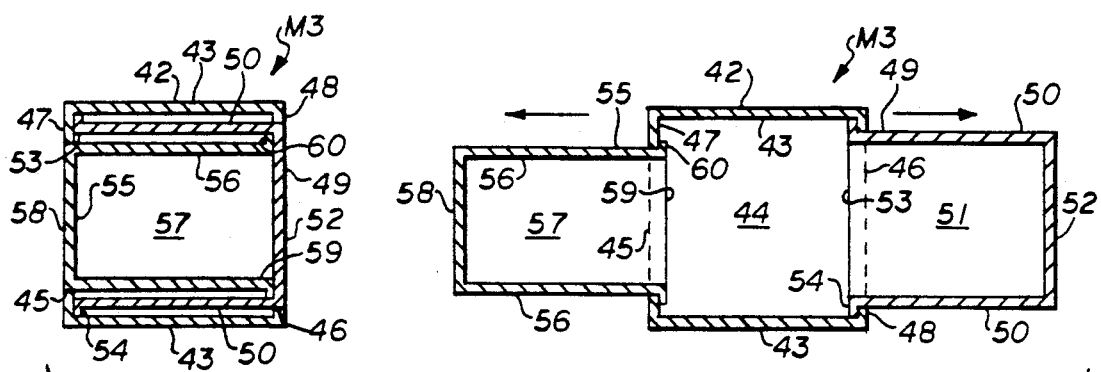

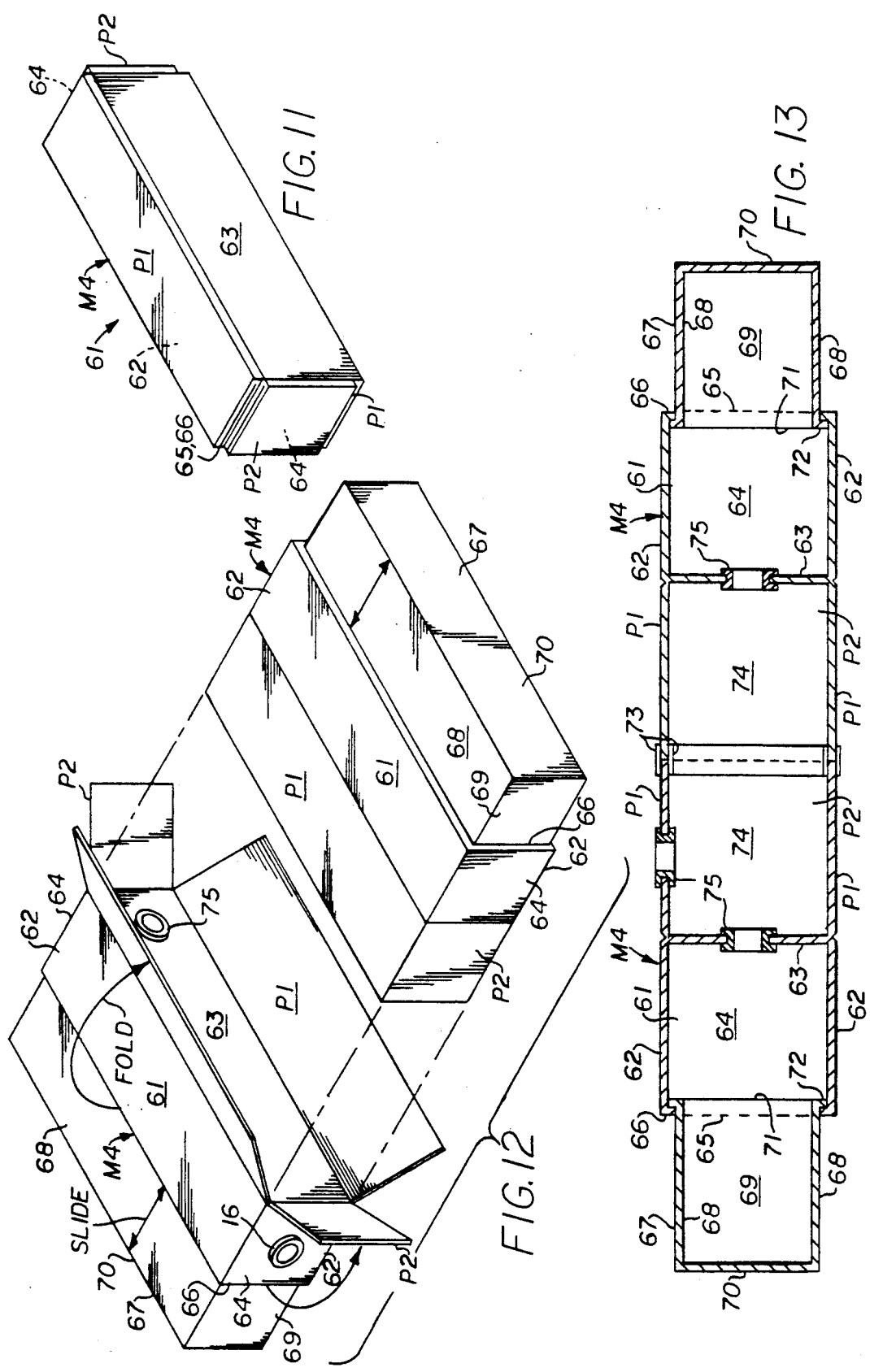

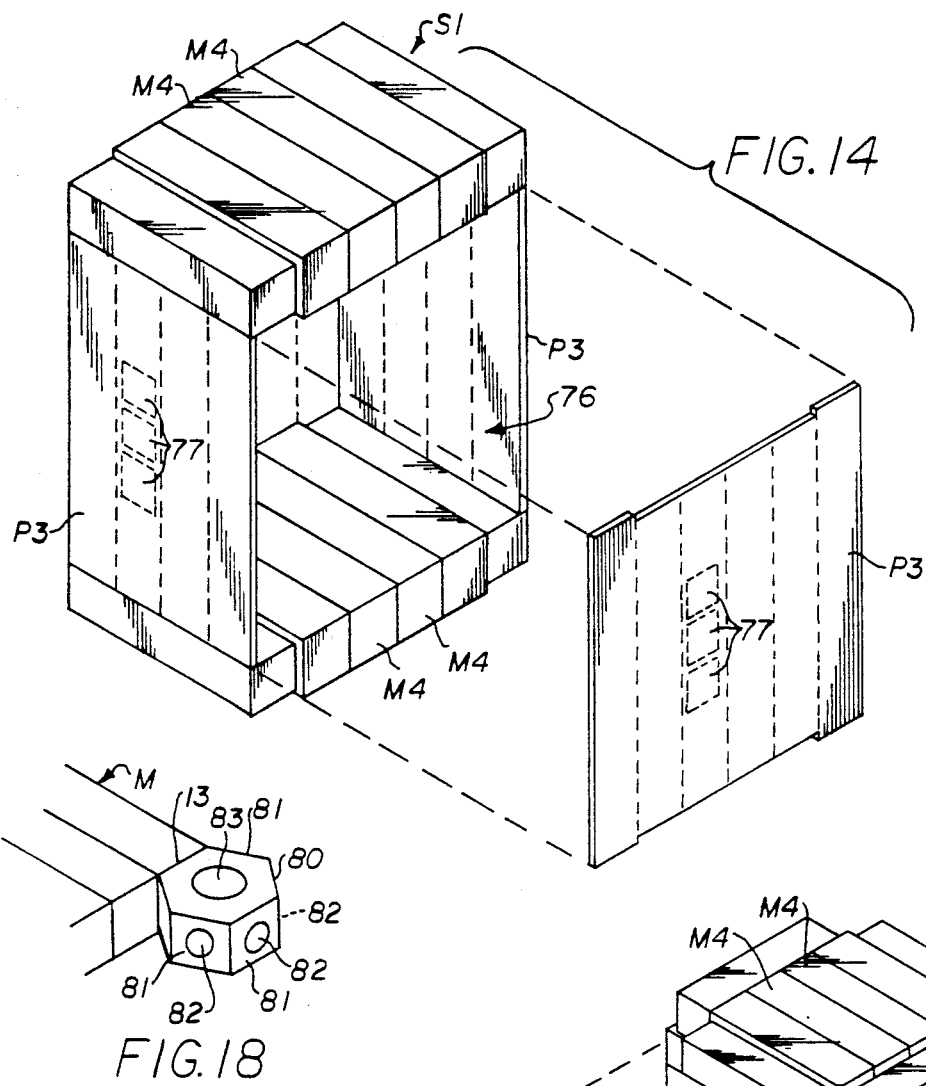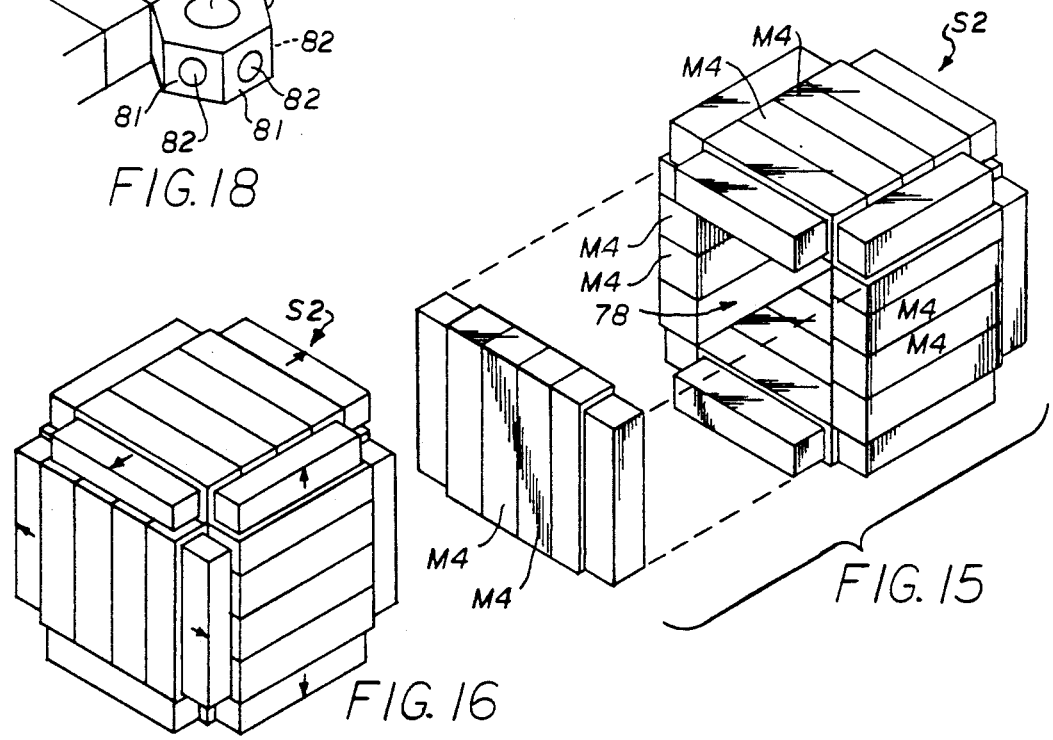

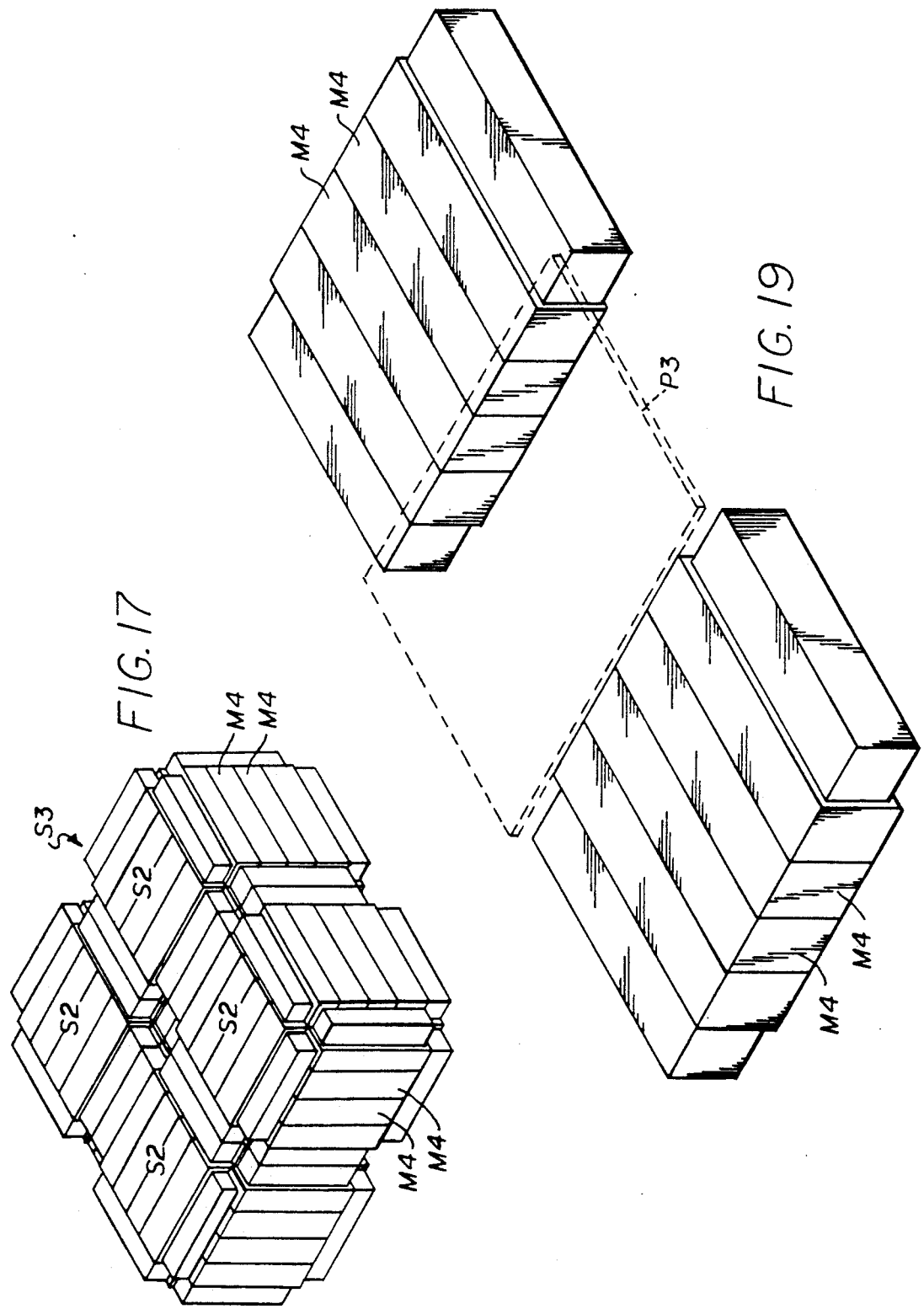

MODULAR SPACE STRUCTURE

CROSS REFERENCE TO RELATED APPLICATION

This application is a continuation-in-part of copending application Ser. No. 07/194,042 filed May 13, 1988, now U.S. Pat. No. 4,878,637 which is continuation-in-part of aplication Ser. No. 06/900,094 filed Aug. 25, 1986, now U.S. Pat. No. 4,744,533 issued May 17, 1988.

BACKGROUND OF THE INVENTION

1. Field of the Invention

This invention relates generally to modular space structures, and more particularly to a modular space structure erected in outer space from expandable modules transported in the payload bay of a space shuttle or by expendable rocket which expand to increase the volume of enclosed area and are joined to like modules to form a central enclosed area between the modules.

2. Brief Description of the Prior Art

Toroidal space station structures have been designed that could be lifted into earth orbit in one shot, and then deployed out to their operational form. The more recent Skylab is an example of a one-shot space station that was put into earth orbit. Severe size and weight restrictions of such one-shot space stations limit the effective working life of the space station and limit the exhaustible staples required to support life for its inhabitants. The size and weight restrictions also limit other necessities such as providing artificial gravity to overcome the effect of weightlessness over extended periods of time.

Very large self-sufficient space station structures have also been proposed which would support many forms of terrestrial life. Most self-supporting space structures would be so large as to make it impractical to erect them piecemeal on earth and lift them piece by piece to be assembled in earth orbit. It has been suggested that they may have to be fabricated in earth orbit from raw materials carried on a space shuttle or from earth's moon.

The large wheel-like structures are a result of the concept that artificial gravity would be necessary for long-term habitation. The current state of the art has replaced the wheel designs with living and working modules connected together around a hub with outwardly extending feelers, collectors and manipulators which resemble a robotic spider.

State of the art "clustered module" concepts have been proposed by the National Aeronautics and Space Administration (NASA) and from NASA contractors such as McDonnell Douglas Astronautics Co., TRW Space and Technology Group, Rockwell International, and Boeing Aerospace Company.

The above mentioned "clustered modules" are aggregations or conglomerations which feature a central open frame structure having various cylindrical modules spaced thereabout and connected together by a network of pressurized tubes. The modules are interconnected by joining them together end to end or joining their ends together with pressurized tubes. Later shuttle trips would add modules or appendages to that basic structure. The modules are suggested to be approximately 14 ft. in diameter by 24 ft. long. The volume of each such cylinder would be 3,700 cu. ft. One of these cylinders would house a crew of six to eight astronauts. One disadvantage of the current clustered module designs is that the total area is linear and there is no central enclosure, resulting in segmented crowded habitable areas. There is no central enclosure common to the modules and the total useful volume is spread out over spaced apart modules connected by tubes.

Another disadvantage of the current clustered module designs is that each module requires an expensive separate launch to create a large structure, whereas with the present invention the amount of usable area or volume can be doubled or tripled with a single launch, and after two launches it is possible to create a large structure having a central enclosed area common to the modules which may be used for various purposes. The equivalent number of modules of the prior art and currently proposed space stations would provide only spaced apart modules with no common central enclosure.

There are several patents which disclose space modules capable of forming various space station configurations, most of which consist of a ring-like shape having a central hub. Others provide various modules to serve as the core of the station structure.

Hogan, U.S. Pat. No. 4,057,207 discloses a module having the geometry of joined truncated icosohedra, which when a plurality of them are joined together, form a space vehicle. The vehicle formed would consist of two types of rings or four varieties of helices. The helical configuration would allow simple gravity to be generated by way of rotation and also serve as a habitable framework about which a large cylindrical space structure could be built. Hogan teaches joining the modules more or less end-to-end in a linear manner. The actual usable space in such configurations is limited to a relatively long and narrow tube.

Schneider et al, U.S. Pat. No. 4,579,302 discloses a shuttle-launch triangular space station deployable in earth orbit. The framework is comprised of three trusses having generally planar faces comprised of foldable struts which expand and lock into structural engagement forming a repetition of equilateral triangles and non-folding struts interconnecting the two faces. Cylindrical modules may be secured to the three apexes of the framework and connected together by tunnels. The modules may be used for habitat, logistics, service, and laboratory.

Berglund, U.S. Pat. No. 3,169,725 discloses a compact folded space station which is collapsed and transported in the payload bay of a launch vehicle. The station utilizes rigid cylindrical sections, equipped for life support and experiments before launch, joined together by flexible connectors. These sections are connected to a central hub and are erectable to form a rigid hexagonal tubular ring thereabout in earth orbit. The sections are connected to the hub by spoke-like telescoping struts and may also be interconnected by inflatable access tubes.

Nesheim, U.S. Pat. No. 3,332,640 discloses a preassembled space station comprising tubular sections pivotally connected end to end to form a ring-like structure.

Berce, et al, U.S. Pat. No. 3,792,558 is not a space station, but rather a transportable, ground supported dwelling structure which requires a rigid parallelopedic mounting frame structure having longitudinal, transverse, and vertical beam-like structural members. The frame structure serves as the shipping container, or "transcontainer" for rectangular "hull" members and as the base framework onto which the room-like "hulls" are mounted to form a dwelling. The modular hulls require a rectangular flange around all the edges to enable their fixing onto the framework.

Taylor, U.S. Pat. No. 4,562,979 discloses an expandable spacecraft which includes at least one main cylindrical body of generally waffle-type structure which has a plurality of flanges extending radially from the body. An auxiliary housing is connected to the main body and slidably and telescopically received therein. The auxiliary housing can be expanded outwardly from the main body to increase the volume of the assembly to a degree. There is no suggestion of joining the modules to like modules to form a common central enclosed area.

Ganssle et al, U.S. Pat. No. 4,395,004 discloses spacecraft structures suitable for mounting in the payload bay of a space shuttle. Each structure comprises a plurality of modules in the form of a truss network secured to one another. Various equipment can be attached to the trusses.

Truss, U.S. Pat. No. 4,480,415 discloses an extendible open boom structure for use in constructing orbital platforms.

Bull, U.S. Pat. No. 4,792,108 discloses a pair of compartments tethered together which are mounted in spaced relation by an extendible pole.

The present invention is distinguished over the prior art in general, and these patents in particular by a modular space structure having a central enclosed area which is erected in outer space from modules transported by a reusable space shuttle or an expendable rocket. Each module comprises an outer member and one or more inner members carried telescopically therein forming a complete enclosure to serve as a small self contained space structure capable of being equipped for life support. Each inner member has slightly less volume than the outer member in which it is nested. As each inner member is extended, the interior volume is increased and a larger enclosure is formed. A two member module, when extended, would nearly double the amount of initial enclosed usable space, and an extended three member module would nearly triple the amount of initial enclosed usable space. The expandable modules serve as building blocks which may be joined to other like modules in various configurations to form a complete enclosure about a common interior volume with the modules forming the walls of the enclosure to create increasingly larger space structure units having a plurality of enclosed central areas. Passageways allow occupant communication between the modules and the central enclosure. Adapter modules and various other devices such as docking ports for docking space craft to the structure and thrust generating or communication devices may be secured to the modules.

SUMMARY OF THE INVENTION

It is therefore an object of the present invention to provide a modular space structure having a central enclosed area and erected in outer space from modules transported in the payload bay of a space shuttle.

It is another object of this invention to provide a modular space structure formed of modules having an outer member and one or more inner members carried telescopically therein which may be expanded form a larger complete enclosure having greatly increased interior usable area.

It is another object of this invention to provide a modular space structure having extendible panels which are joined to create a common central enclosed area between at least two habitable modules.

Another object of this invention is to provide an efficient method of creating enclosed space structures utilizing habitable modules as the building blocks forming the enclosure.

Another object of this invention is to provide a method of constructing a modular space structure in outer space to produce maximum habitable area with a minimum amount of material and construction.

Another object of this invention is to provide a method of constructing a modular space structure in outer space to produce a large usable area capable of supporting colonies of human inhabitants.

A further object of this invention is to provide a modular space structure unit capable of being repetitively joined with similar modular space structure units to provide increasingly larger space structures.

A still further object of this invention is to provide a modular space structure which is economical to manufacture and may erected easily and quickly in outer space.

Other objects of the invention will become apparent from time to time throughout the specification and claims as hereinafter related.

The above noted objects and other objects of the invention are accomplished by a modular space structure having a central enclosed area which is erected in outer space from modules transported by a reusable space shuttle or an expendable rocket. The modules have panels which extend outwardly to join the modules together in spaced relation to form a complete enclosure about a common interior volume with the panels and modules forming the walls of the common enclosure. When two modules are so joined a single space structure unit is created with a common central area having approximately the same volume as the modules. The single space structure units serve as building blocks which may be joined in various configurations to create increasingly larger space structure units having a plurality of enclosed central areas. The modules and central areas created thereby serve as usable space for various purposes and capable of being equipped to support life. Passageways allow occupant communication between the modules and the central enclosure. Adapter modules may be secured to the modules and various other devices such as docking ports for docking space craft to the structure and thrust generating or communication devices.

BRIEF DESCRIPTION OF THE DRAWINGS

FIG. 1 is a side elevation of a space shuttle having an expandable space structure module contained within the payload bay.

FIG. 2 is an isometric view of an expandable two-member space structure module shown in the nested position.

FIG. 3 is a transverse cross section view of the two-member space structure module of FIG. 2 taken along line 3—3 showing the inner and outer members in the nested position.

FIG. 4 is a transverse cross section view of the two-member space structure module of FIG. 2 showing the inner and outer members in the expanded position.

FIG. 5 is a partial cross section showing the flange details of the inner and outer members.

FIG. 6 is a partial cross section showing the flanges of the inner and outer members secured together when the members are expanded.

FIG. 7 is an isometric view of a pair of spaced two-member modules prior to being joined and showing the members being extended.

FIG. 8 is a transverse cross section view of a pair of two-member modules having the outer members joined together and the inner members in the expanded position.

FIG. 9 is a transverse cross section view of a three-member space structure module showing, on the left side, the outer, intermediate, and inner members in the expanded position, and on the right side, showing them in the expanded position.

FIG. 10 is a transverse cross section view of another three-member space structure module showing, on the left side, the outer, intermediate, and inner members in the expanded position, and on the right side, showing them in the expanded position.

FIG. 11 is an isometric view of a combination expandable two-member space structure module having inner and outer members and extendible panels shown in the nested position.

FIG. 12 is an isometric view of a pair of combination expandable modules prior to being joined and showing the panels being extended.

FIG. 13 is a transverse cross section view of a pair of the combination expandable modules showing the inner and outer members in the expanded position and the panels extended and joined together to form a larger space structure unit.

FIG. 14 is an isometric view of two pairs of the larger space structure units of FIG. 13 joined in spaced relation by panels to form a subsequent larger space structure unit having a central common enclosed area.

FIGS. 15 and 16 are isometric views of pairs of the larger space structure units of FIG. 13 joined together and assembled to form the walls of a subsequent larger space structure unit having a central common enclosed area surrounded by walls having a plurality of enclosed areas.

FIG. 17 is an isometric view of a plurality of the larger space structure units of FIG. 16 joined together to form an even larger subsequent space structure unit having a plurality of central common enclosed areas surrounded by walls having a plurality of enclosed areas.

FIG. 18 is a partial isometric view of a module having a docking module connected thereto.

FIG. 19 is an isometric view of two pairs of the larger space structure units of FIG. 13 in spaced relation and joined by a panel extending therebetween to form a space structure unit on the surface of a planet or star.

DESCRIPTION OF THE PREFERRED EMBODIMENT

Referring to the drawings by numerals of reference, there is shown in FIG. 1, a space shuttle V having one or more modules M transported in its payload bay. The modules are of a size and shape to substantially follow the geometry of the payload interior. The modules may also be transported as the payload on expendable rockets.

As shown in FIGS. 2, 3, and 4, a preferred expandable module M comprises a pair of hollow rectangular members telescopically joined to form a complete enclosure. The outer rectangular member 10 has opposed top and bottom walls 11, one longitudinal side wall 12, and opposed end walls 13. The walls 10-13 form an outer rectangular structure with one open longitudinal side 14. An inwardly facing lip or flange 15 surrounds the open side 14.

The inner rectangular member 16 has opposed top and bottom walls 17, one longitudinal side wall 18, and opposed end walls 19. The walls 17-19 form an inner rectangular structure with one open longitudinal side 20. The inner member 16 is slidably received within the outer member 10 in laterally opposed relation whereby the opposed longitudinal side walls 12 and 18 enclose the telescoped members 10 and 16. An outwardly extending peripheral lip or flange 21 surrounds the open longitudinal side 20.

The outer dimensions of the outer member 10 are slightly less than the payload bay interior to facilitate installation and removal, and the dimensions of the inner member 16 are slightly less than the interior of the outer member to be slidably received therein. However, for simplicity and ease of understanding, the dimensions of both the outer member and the inner member will be referred to as approximately the same. For example, in the expanded or extended position (FIG. 4), a two-member module would provide approximately twice as much volume of usable enclosed space as in the nested configuration (FIG. 3).

As seen in FIGS. 5 and 6, a seal 22 is provided on the periphery of the inner member flange 21 to form an airtight seal against the interior of the outer member 10. Another seal 23 is provided on the inner periphery of the outer member flange 15 to seal on the exterior of the inner member 16. An air passageway 24 disposed between the seals 22 and 23 allows air to escape when the members are being expanded. Once the inner and outer members 10 and 16 have been expanded, they may be secured in the expanded position by suitable means, such as installing bolts 25 through both members. A secondary seal 26 may also be installed between the opposed surfaces of the flanges 15 and 21.

The members 10 and 16 may by expanded by mechanically pulling them away from each other or by pressurizing the interior of the nested module M sufficient to expand the inner and outer members apart until their flanges 15 and 21 are abutting. They may be collapsed to the nested position by reversing the process or by applying pressure through the passageway 24 between the seals 22 and 23 and reducing the pressure in the interior of the members.

A single two-member module M may be pressurized and expanded to serve as a small space structure such as a space station until two or more have been deployed from the payload bay of the transport vehicle. As seen in FIGS. 7 and 8, when at least two modules M have been deployed and expanded, they may be joined together by positioning them in laterally opposed relation and securing them together by conventional methods. For example, the longitudinal sides of the modules may be butted together, and the seam between the panels sealed with epoxy material and overlapped on the interior and exterior surfaces by a strip 27 of suitable fabric or metallic reinforcing material. The modules M may also be joined by other methods conventional in the art, such as by clamping, bolting, or magnetism.

After one two-member module has been deployed from the transport vehicle and expanded it provides approximately double the amount of usable space with one launch. This will serve as a small habitable space structure or vehicle until two or more have been deployed from the payload bay of the transport vehicle. When at least two modules have been deployed, expanded, and joined together with a similar module, the assembly provides approximately 4 times the amount of usable space of a single nested module.

Hatches or passageways 28 may be installed through the walls of the inner and/or outer members to allow occupants to travel between the modules. The passageways 28 are preferably in the form of an airlock so that the interior of the modules may be closed off during construction or in the event that a pressure leak should develop.

FIGS. 9 and 10 illustrate modifications of the two-member expandable module wherein two sliding members are nested within the outer member for providing approximately 3 times the amount of usable space of the outer nested module with a single launch. The three-member module M2 shown in FIG. 9 comprises the previously described outer rectangular member 10 having opposed top and bottom walls 11, one longitudinal side wall 12, opposed end walls 13 and one open longitudinal side 14 with an inwardly facing flange 15 surrounding the open side 14.

The intermediate rectangular member 29 has opposed top and bottom walls 30, and opposed end walls 31 with opposed open longitudinal sides 32 and 33 which form a hollow rectangular structure with open longitudinal sides. The intermediate member 29 is slidably received within the outer member 10. An outwardly extending peripheral flange 34 surrounds the open side 32 and an inwardly extending flange 35 surrounds the open side 33.

The inner rectangular member 36 has opposed top and bottom walls 37, one longitudinal side wall 38, and opposed end walls 39. The walls 37-39 form an inner rectangular structure with one open longitudinal side 40. The inner member 36 is slidably received within the intermediate member 29. An outwardly extending peripheral flange 41 surrounds the open side 40.

The outer dimensions of the outer member 10 are slightly less than the payload bay interior to facilitate installation and removal, the dimensions of the intermediate member 29 are slightly less than the interior of the outer member 10 to be slidably received therein, and the dimensions of the inner member 36 are slightly less than the interior of the intermediate member 29 to be slidably received therein. As previously described, suitable peripheral seals may be provided on the flanges and air passageways disposed between the seals to allow air to escape when the members are being expanded.

The three-member module M3 shown in FIG. 10 comprises an outer rectangular member 42 having opposed top and bottom walls 43, opposed end walls 44, and opposed open longitudinal sides 45 and 46 which form a hollow rectangular structure with open longitudinal sides. An inwardly extending flange 47 surrounds the open side 45 and an inwardly extending flange 48 surrounds the open side 46.

The intermediate rectangular member 49 has opposed top and bottom walls 50, opposed end walls 51, one longitudinal side wall 52, and one open longitudinal side 53 which form an intermediate rectangular structure with one open longitudinal side. The intermediate member 49 is slidably received within the outer member 42 in laterally opposed relation whereby the intermediate member 49 will slide outwardly through the longitudinal side 46. An outwardly extending peripheral flange 54 surrounds the open side 53.

The inner rectangular member 55 has opposed top and bottom walls 56, opposed end walls 57, one longitudinal side wall 58, and one open longitudinal side 59 which form a rectangular structure with one open longitudinal side. The inner member 55 is slidably received within the intermediate member 49 in laterally opposed relation whereby the inner member 55 will slide outwardly through the longitudinal side 45 of the outer member 42. An outwardly extending peripheral flange 60 surrounds the open side 59 to engage the interior of the intermediate member 49 in the nested position.

The outer dimensions of the outer member 42 are slightly less than the payload bay interior to facilitate installation and removal, the dimensions of the intermediate member 49 are slightly less than the interior of the outer member 42 to be slidably received therein, and the dimensions of the inner member 55 are slightly less than the interior of the intermediate member 49 to be slidably received therein.

As previously described, suitable peripheral seals may be provided on the flanges and air passageways disposed between the seals to allow air to escape when the members are being expanded.

After one three-member module M2,M3 has been deployed from the transport vehicle and expanded, it provides approximately triple the amount of usable space of the nested module with one launch. The expanded module may serve as a small space structure such as a space station or vehicle until two or more modules have been deployed from the payload bay of the transport vehicle. After two launches and when at least two three-member modules have been deployed, expanded, and joined together with a similar module, the structure provides approximately 6 times the amount of usable space of one single nested module.

FIGS. 11, 12, and 13 show another modified expandable module M4 similar to the two-member module but which also has folding panels hinged along one side which may be unfolded to form additional usable space between joined modules. A preferred combination module M4 comprises an outer rectangular member 61 having opposed top and bottom walls 62, one longitudinal side wall 63, and opposed end walls 64 which form an outer rectangular structure with one open longitudinal side 65. An inwardly facing flange 66 surrounds the open side 65.

A pair of rectangular panels P1 are hingedly joined to the longitudinal edges of the longitudinal wall 63 and are stored in a folded position against the top and bottom walls 62 of the outer member 61. Another set of generally square end panels P2 are hingedly joined to the side edges of the longitudinal wall 63 and are stored in a folded position against the end walls 64 of the outer member 61.

The inner rectangular member 67 has opposed top and bottom walls 68, opposed end walls 69, one longitudinal side wall 70, and one longitudinal open side 71 to form a rectangular structure with one open longitudinal side. The inner member 67 is slidably received within the outer member 61 in laterally opposed relation. An outwardly extending peripheral flange 72 surrounds the open side 71.

The outer dimensions of the outer member 61 are slightly less than the payload bay interior to facilitate installation and removal, and the dimensions of the inner member 67 are slightly less than the interior of the outer member to be slidably received therein.

In the collapsed or nested condition (FIG. 11), the panels P1 are stored in a folded position against the top and bottom walls 62 of the outer member 61, the end panels P2 are stored in a folded position against the end walls 64 of the outer member, and the inner member 67 is slidably received within the outer member 61 to form an enclosed rectangular structure. The structure may be used in the nested condition as a small space structure or vehicle and may be provided with life support systems.

After the nested module has been deployed from the transport vehicle, the inner member 67 may be expanded outward from the outer member 61 to approximately double the amount of usable space of the nested module. As seen in FIGS. 12 and 13, after two such modules have been deployed from the transport vehicle and expanded, they may be joined by positioning them generally parallel and unfolding or pivoting the panels P1 and P2 on each of the modules to a position perpendicular to the longitudinal wall 63 of the outer member. The outward edges of the laterally opposed panels are joined together end to end and the seams between the panels sealed by conventional methods. For example, the edges of the panels may be butted together and the seam of the butt joint and the corner seams between the panels sealed with epoxy material and overlapped on the interior and exterior surfaces by a strip 73 of suitable fabric or metallic reinforcing material to form an airtight seal. Airtight seals may also be installed between the mating surfaces when adjoining the panels. The panels may also be joined by other methods conventional in the art, such as by clamping, bolting, or magnetism.

The panels P1 and P2, when properly joined and sealed, provide a large enclosed common area 74 between the modules which may also pressurized to provide additional usable space. After two launches and two modules M4 have been deployed and joined, the structure provides approximately 6 times the amount of usable space of a single nested module.

Hatches or passageways 75 may be installed through the walls of the modules and/or the panels P1, P2 to allow occupants to travel between the modules and the central enclosure 74. The passageways 75 are preferably in the form of an airlock so that communication between selective modules and the central enclosure 74 may be closed during construction or in the event that a pressure leak should develop.

Each individual module may be self sufficient to support life and provide living quarters as more modules are added with subsequent shuttle flights. Also various modules may be equipped for a special purpose, such as living quarters, mechanical, life support system, food supply or storage, etc. After one modular space structure has been formed then other modules may be added to the structure, or several space structures joined together to form larger modular structures.

FIG. 14 shows a large space structure S1 created by utilizing four of the combination modules M4 of the type previously described with reference to FIGS. 12 and 13. Two joined pairs are placed in spaced apart parallel relation and connected together by a plurality of panels P3 joined to the opposed outer edges of the adjoined modules M4 to extend between the spaced pairs of modules to form a cube-shaped space structure S1 having an enclosed common interior area or volume 76.

The panels P3 used in the construction of the space structure S1 preferably correspond with the dimensions of the basic outer member and comprise a folded panel having sections which unfold and lock into a rigid panel.

The surface of the panels P1, P2, P3 and/or the walls of the modules may also contain energy gathering cells 77 such as solar cells, or be comprised of radiation or heat deflecting materials to capture the vast energy available in outer space for use inside the space structure or which may be converted inside the space structure to a form suitable for sending to the earth. Obviously, the space structures utilizing panels can be constructed very quickly and provide a very large central enclosure with as few as two or three shuttle trips.

FIGS. 15 and 16 show a cube shaped space structure S2 created by joining six of the pairs of joined modules M4 of the type previously described with reference to FIGS. 12 and 13. The space structure S2 utilizing the assembled modules M4 are joined together along adjacent edges to form the side walls of the larger space structure unit and so joined, create another large enclosed common interior area or volume 78 in the center surrounded by walls having a plurality of enclosed areas or volumes.

After one larger space structure unit S2 has been formed (FIG. 16) then other modules may be added to the structure, or several of the larger space structure units S2 joined together to form even larger modular structures. For example, FIG. 17 illustrates a cubic space structure S3 formed by joining four of the previously described cube shaped space structure units S2. The cube shaped space structures S3 could also be spaced apart to form the corners of an even larger cube which would be enclosed by panels or joined to serve as the walls of a very large structure in the manner previously described.

The exterior surfaces of the previously described modules M, M2, M3, or M4 may be also be provided with a berthing or docking port for self propelled vehicles. For example, as shown in FIG. 18, adapter modules 80 having one or more side walls 81 may be secured to the modules M for various purposes. The outwardly angular side walls 81 may be configured to provide berthing or docking ports 82 for docking space craft to the modules or modular space structures. The exterior surface of the adapter modules 80 may also serve as the means by which thrust generating, communication and energy gathering devices 83 may be affixed to a convenient location on an individual module or a space structure assembly.

By expanding the modules and enclosing a central common area, the present invention is a highly efficient and utilitarian use of modular construction not provided in other modular space structure systems such as wheel-like structures and "clustered module" aggregations and conglomerations which have a central open frame structure with various cylindrical modules spaced apart thereon and connected together by a network of pressurized tubes. The efficient use of space is diminished in these systems due to the fact that the total usable area is linear, resulting in crowded habitable quarters, and there is no common central enclosure.

It should be understood from the foregoing description that the modular construction as herein described will provide the maximum amount of usable space with a minimum amount of materials and labor. One of the major features of the present modular space structures is that the hollow modules each contain usable space, and they additionally serve as building blocks to be joined in a predetermined pattern to form a complete enclosure about a common area. This feature makes it possible to create the maximum amount of usable space with the minimum amount of materials and the least number of trips into space.

The present space structure may also be utilized as a vehicle suitable for use in traveling to other planets or stars, such as a Mars vehicle. The central enclosed area in the structures may be used to store the large volume of cryogenic fuel needed to reach Mars (approximately 70,000 cu. ft.), and still leave room for a large habitable closed loop life support system. For example, a supplementary life support system could utilize human wastes to feed vegetation and plants providing food and which in turn would absorb carbon dioxide and replace it with oxygen.

Cryogenic fuel would be shielded from radiant heat from the sun, yet be kept cool by exposed pipes on the shaded side of the vehicle or structure. To further protect the fuel from penetration by space garbage or meteorites, the enclosed area could be partitioned into many small modules or tanks, such that only one tank would be lost in the event of a leak.

The present space structures are also particularly suitable as habitable facilities or storage facilities on other planets or stars. They may be used in traveling to the destination and once in orbit around the destination, they may be easily and quickly collapsed and nested for transporting them to the surface of the destination planet or star.

Once on the surface, they may be easily and quickly expanded and joined in the manner previously described. For example, FIG. 19 shows a pair of joined modules M4 of the type previously described with reference to FIGS. 12 and 13. The joined modules are supported on the surface in a parallel spaced relation and a panel P3 of the type previously described is installed between the assembled modules M4 such that the modules form one or more side walls of the structure. A large covered area is created between the modules beneath the panel P3. Thus, the modular structures may be utilized to travel to the destination and the same structures re-assembled on the destination surface thereby reducing the need to transport additional building materials to create habitable or storage facilities once having reached the destination.

It should also be understood, that the structures may be disassembled or separated in the proximity of the destination whereby some of the modules may remain in space as a vehicle while others of the modules are transported to the surface of the destination.

While this invention has been described fully and completely with special emphasis upon several preferred embodiments, it should be understood that within the scope of the appended claims the invention may be practiced otherwise than as specifically described herein.

I claim:

1. A space structure assembled in outer space comprising;
   slidably connected hollow modules transported into outer space in a telescopically nested condition by rocket and extended outwardly relative to one another to form a complete enclosure about a common interior volume, said modules forming the walls of the common enclosure,
   two or more of said modules being telescopically nested one within the other in generally parallel relation and extendible relative to one another with the outermost said modules having an end wall forming the end walls of the common enclosure and said modules having a side wall forming the exterior wall of the common enclosure to create a single space structure unit having a central area within said walls,
   said modules in the extended condition forming a single space structure unit having a central area within the extended modules the volume of which exceeds the volume of said modules in the nested condition, and
   the exterior of said single space structure unit configured to be joined with like units whereby a plurality of said single space structure units can be joined together in a predetermined pattern to form a complete enclosure about a common interior volume to create a further larger space structure unit having a plurality of enclosed central interior volumes.

2. A space structure according to claim 1 in which said modules are transported into outer space in the payload bay of a space shuttle.

3. A space structure according to claim 1 in which said modules comprise hollow polygonal members.

4. A space structure according to claim 1 in which said modules comprise hollow generally rectangular members.

5. A space structure according to claim 1 in which a plurality of said single space structure units are joined together in a predetermined pattern to create a larger space structure unit having a plurality of enclosed central interior volumes.

6. A space structure according to claim 1 in which said joined single space structure units form the enclosure exterior walls surrounding the common interior volume, whereby
   said larger space structure unit has a central enclosed volume surrounded by walls having a plurality of enclosed central interior volumes.

7. A space structure according to claim 6 in which said joined single space structure units forming the exterior walls of the common interior volume create a generally cubic larger space structure unit.

8. A space structure according to claim 1 in which a plurality of said larger space structure units are joined together in a predetermined pattern to create a still larger space structure unit having a plurality of enclosed central interior volumes surrounded by walls having a plurality of enclosed central interior volumes.

9. A space structure according to claim 1 in which two or more of said single space structure units are joined in generally parallel spaced relation by panels extending therebetween and form two exterior walls of the common enclosure and said panels extending therebetween form four exterior walls of the common enclosure of said larger space structure unit.

10. A space structure according to claim 9 in which said single space structure units comprise enclosed hollow polygonal modules having movable panels extendible therefrom.

11. A space structure according to claim 9 in which said single space structure units comprise enclosed hollow generally rectangular modules having movable panels extendible therefrom.

12. A space structure according to claim 9 including sealing means installed between mating surfaces of said modules and said panels forming an airtight seal about the enclosed central interior volume.

13. A space structure according to claim 1 in which two or more single space structure units are joined in spaced relation by panels extending therebetween to form a complete enclosure about a common interior volume, said panels and modules forming the walls of the common enclosure, said modules forming end walls of the common enclosure and said panels forming adjacent mating side walls of the common enclosure to create a larger space structure unit having a central enclosed area between said joined single space structure units.

14. A space structure according to claim 13 in which said single space structure units are joined in generally parallel relation by said panels.

15. A space structure according to claim 1 in which said modules have passageways in their surfaces sealed for selective communication with other modules.

16. A space structure according to claim 1 in which said modules have passageways incorporated into their surfaces facing said enclosed central interior volume and sealed for selective communication with said central interior volume.

17. A space structure according to claim 1 including sealing means installed between mating surfaces of said modules forming an airtight seal about the enclosed central interior volume.

18. A space structure according to claim 1 in which exterior surfaces of certain ones of said modules include a docking port for connecting self propelled vehicles to the structure.

19. A space structure according to claim 1 including adapter modules secured to certain ones of said modules and having docking ports for connecting space craft to the structure.

20. A space structure according to claim 1 including adapter modules secured to certain ones of said modules and having thrust generating means for propelling the structure.

21. A space structure according to claim 1 including adapter modules secured to certain ones of said modules and having communication means for transferring information between the structure and another point.

22. A space structure according to claim 1 including adapter modules secured to certain ones of said modules and having energy gathering means for gathering energy present in the structure environment.

23. A method of creating habitable enclosure in outer space comprising the steps of;
constructing a series of hollow modules on the earth's surface,
slidably connecting the hollow modules and assembling then in a telescoped nested position,
transporting said modules by rocket or vehicle into outer space,
deploying said modules from the transport rocket or vehicle,
expanding said modules from their nested position to an extended position relative to one another to form a complete enclosure about a common interior volume with said modules forming the walls of the common enclosure, two or more of said modules being telescopically nested one within the other in generally parallel relation and extended relative to one another with the outermost said modules having an end wall forming the end walls of the common enclosure and said modules having a side wall forming the exterior wall of the common enclosure to create a single space structure unit having a central area within said walls and having an exterior configured to be joined with like units, and joining a plurality of said single space structure units together in a predetermined pattern to form a complete enclosure about a common interior volume to create a further larger space structure unit having a plurality of enclosed central interior volumes.

24. A method according to claim 23 in which said modules in the nested position configured on a geometry closely following the interior of the payload bay of a space shuttle,
said modules are transported in the payload bay of a space shuttle into outer space, and deployed in outer space from the payload bay.

25. A method according to claim 23 in which a plurality of said single space structure units are joined together in a predetermined pattern to create a larger space structure unit having a plurality of enclosed central interior volumes.

26. A method according to claim 23 including the step of
joining said joined single space structure units together to form exterior walls of the enclosure surrounding the common interior volume, whereby
said larger space structure unit has a central enclosed volume surrounded by walls having a plurality of enclosed central interior volumes.

27. A method according to claim 26 including the step of
joining a plurality of said larger space structure units together in a predetermined pattern to create a subsequent larger space structure unit having a plurality of enclosed central interior volumes surrounded by walls having a plurality of enclosed central interior volumes.

28. A method according to claim 23 including the step of
joining two or more of said single space structure units in generally parallel spaced relation, and
securing panels to extend therebetween, whereby
said joined space structure units form two exterior walls of the common enclosure and said panels extending therebetween form four exterior walls of the common enclosure of said larger space structure unit.

29. A method according to claim 28 including the step of
installing sealing means between mating surfaces of said modules and said panels to form an airtight seal about the enclosed central interior volume.

30. A method according to claim 23 in which two or more single space structure units are joined in spaced relation by panels extending therebetween to form a complete enclosure about a common interior volume, said panels and modules forming the walls of the common enclosure,
said modules forming end walls of the common enclosure and said panels forming adjacent mating side walls of the common enclosure to create a larger space structure unit having a central enclosed area between said joined single space structure units.

31. A method according to claim 30 in which
said single space structure units are joined in generally parallel relation by said panels.

32. A method according to claim 23 including the step of
installing selectively sealable passageways in the surface of said modules for selective communication with the exterior or interior of said modules and said central enclosure.

33. A method according to claim 23 including the step of
installing sealing means between mating surfaces of said modules to form an airtight seal about the enclosed central interior volume.

34. A method according to claim 23 including the step of
installing a docking port on certain ones of said modules for connecting self propelled vehicles to the structure.

35. A method according to claim 23 including the step of
installing thrust generating means on certain ones of said modules for propelling the structure.

36. A method according to claim 23 including the step of
installing communication means on certain ones of said modules for transferring information between the structure and another point.

37. A method according to claim 23 including the step of
installing energy gathering means on certain ones of said modules for gathering energy present in the structure environment.

* * * * *